United States Patent Office 3,374,141
Patented Mar. 19, 1968

3,374,141
ETCHING PROCESS FOR PRODUCING A NON-REFLECTIVE SURFACE ON FLOAT GLASS
Albert E. Junge, New Kensington, and Joseph Chabal, Curtisville, Pa., assignors to Pittsburgh Plate Glass Company, Pittsburgh, Pa., a corporation of Pennsylvania
No Drawing. Continuation-in-part of application Ser. No. 490,710, Sept. 27, 1965, which is a continuation-in-part of application Ser. No. 252,315, Jan. 18, 1963. This application Mar. 20, 1967, Ser. No. 624,204
11 Claims. (Cl. 161—1)

ABSTRACT OF THE DISCLOSURE

The present invention relates to a process for producing a non-glare float glass product having high resolution characteristics. More particularly, the invention relates to a process of contacting a surface of a glass article with molten metal and thereafter contacting the glass article with a mat etching solution for a sufficient period of time to provide a low specular reflecting surface on those surfaces not contacted with the molten metal; the metal contacted surface retaining its highly reflective appearance. The invention provides an improvement over traditional mat etching processes inasmuch as a novel means of protecting one surface from the etching solution has been discovered.

CROSS REFERENCES TO RELATED APPLICATIONS

The present application is a continuation-in-part of our copending application Ser. No. 490,710 filed Sept. 27, 1965, now abandoned, which was a continuation-in-part of application Ser. No. 252,315 filed Jan. 18, 1963, now abandoned.

DISCLOSURE

In the present day commercial methods of producing flat glass, the major surfaces generally have high specular reflection characteristics. These high specular reflection characterstics are often quite objectionable, such as when the glass is to be used as a cover for a framed picture, as a cover on a desk, as a clock face, as a face plate on a television picture tube or as an implosion window for a picture tube due to the fact that the attention of an observer is distracted by images reflected by the smooth surface of the glass.

Heretofore, it had been necessary to use a method involving several operations to produce a low specular reflecting surface on glass. In a typical operation, such as that disclosed in U.S. Patent 2,622,016 issued to Gilstrap, the glass is first cleaned and otherwise prepared for the later treatments by contacting with a dilute hydrofluoric acid solution. It is then treated in a suitable frosting solution. Thereafter the glass is treated in an etching solution which removes the frosted surface from the glass.

It is important in the production of glass articles having low specular reflectance properties for the uses set forth above that the resolution characteristics of the glass not be appreciably impaired, i.e. the scattering of light rays should not interfere with the ability of the glass to resolve the details of an image behind the glass article.

It is an object of this invention to produce a glass article having low specular reflection and good resolution properties. It is another object of this invention to produce such an article by dipping a glass article into an etching solution.

Briefly, the objects of this invention are attained by contacting one major surface of a glass article such as a flat or curved sheet of glass with molten metal such as tin for a short period of time prior to dipping the glass into an etching bath. The surface of the glass sheet which is contacted with the molten tin is mat-etched to a lesser degree than the surfaces of the glass sheet which are not so contacted. The resulting article has one major surface which has relatively low specular reflection characteristics, while the other major (tin contacted) surface is somewhat glossy and has relatively high specular reflection characteristics. The tin contacted, etched surface is almost as reflective as the original unetched flat glass article, the outlines of reflected images being clearly discernible, but not to the same extent as with the unetched article.

The term "mat-etched" is herein used to describe the desired low reflective surface which appears dull, i.e., without gloss or luster. This is necessary to distinguish such surfaces from "clear-etched" surfaces which essentially retain their reflective properties because of uniform removal of glass from said surfaces.

The non-glare article thus produced has improved resolution properties when compared with an article produced without the tin pretreatment when the principal non-glare article is not in direct contact with the article or surface to be viewed. The light reflecting characteristics of the two articles are the same for the surfaces which are not contacted with the tin. Only one side or surface of the glass, i.e., the one nearest the viewer need have low specular reflection characteristics when the glass article is in direct contact with the article or surface to be viewed.

The invention is further described with respect to a particular etching solution, but the invention in its broadest aspect is not limited to use of such solution. Further, it should be understood that other metals such as lead or alloys of tin and lead can be used in the practice of the invention.

In the practice of the invention a glass article, such as a sheet of flat glass, is contacted on one major surface with molten tin. The glass at the time of contact is preferably at a temperature which is substantially the same as or slightly higher or lower than the temperature of the molten tin in order to avoid cracking or breaking of the glass. For example, the glass and tin can be at temperatures in the range of 400 to 700° C. at the time of initial contact with each other. The period of contact can range from about 1 to 10 or more minutes. Thereafter, the glass is cooled to room temperature, cleaned and dipped in an etching solution for a sufficient time to develop the non-glare surface on the major surface which was not contacted with the tin.

Other suitable glasses include potassia-lime-silica glass, lithia-alumina-silica glass, lead-alkali-silica glass, and similar alkali containing glasses. Also, the glasses may have received some prior treatment such as polishing or ion exchange of alkali ions or crystallization by appropriate techniques.

The glass articles utilized in accordance with the practice of this invention may be of any alkali contaiing glass, but is preferably lime-soda-silica glass. A particularly useful glass is one having the following approximate compositions: from 50 to 75 percent by weight of $SiO_2$; from 5 to 17 percent by weight of $Na_2O$; from 0 to 10 percent by weight of $K_2O$; the sum of $Na_2O$ and $K_2O$ being from 10 to 18 percent by weight; from 0 to 15 percent by weight of CaO; from 0 to 7 percent by weight of MgO, the sum of CaO and MgO being from 0 to 16 percent by weight.

An etching solution which is suitable for the one-dip process of the present invention comprises an aqueous solution of hydrogen fluoride and ammonium bifluoride in which the ratio of parts by weight hydrogen fluoride to parts by weight water is preferably between 1.28 and 1.50 but can be as low as 1.1 and as high as 1.6 and in which the ratio of parts by weight ammonium bifluoride to parts by weight water is preferably between 0.067 and 0.738 but can be as low as 0.05 and as high as 1.0. The etching bath must also contain a sufficient concentration of a solution viscosity controlling material which is relatively inert in the solution to develop a solution viscosity preferably between about 0.88 and 62 centipoises at room temperature (75° F.). The viscosity may, however, be as low as 0.8 centipoise and as high as 75 centipoises and still be suitable for producing various specialty types of etched glass products. The viscosity measurements indicated above are those determined using a Cannon Fenske type of viscometer.

Theoretically, the viscosity of the solution could be maintained within the operable range by cooling the solution to very low temperatures. Such extremely low temperatures may have adverse effects on the process; therefore, a more practicable way of controlling the viscosity is through the use of a soluble viscosity control agent having an OH group selected from the class consisting of hydroxyl, oxyacids, and carboxyl groups.

The ratio of parts by weight viscosity controlling material to parts by weight water in the etching solution may be as low as 0.05 and as high as 4.0 depending upon the viscosity controlling material selected. When sorbitol is used, the preferred ratio of parts by weight sorbitol to parts by weight water is between about 0.0738 and 3.54. Sorbitol can be used, however, over the entire range of parts by weight ratios of 0.05 to 4.0 with reduced effectiveness in developing the desired non-glare surface.

Glycerine and various sugars such as sucrose, dextrose, and molasses may also be employed as the viscosity controlling agent in addition to sorbitol mentioned above, but these other materials are usually not as effective or durable as sorbitol or polyethylene glycol. Broadly, the useful viscosity controlling agents are classified as chemical materials soluble in the above-described solution and containing an OH group.

Control of viscosity is desired in order to control the mobility of the ions in the solution. This, in turn, restricts the zone of influence or activity of the ions and controls the degree of etch. Lower viscosities tend to develop coarse etches and higher viscosities tend to develop finer etches.

The length of time the glass article should be in contact with the etching solution depends on the concentration of the reagents in the solution. Shorter times are required when higher concentrations of HF and ammonium bifluoride and/or lower concentrations of sorbitol are employed. However, it should be noted that the glass composition limits the variation of concentration of the reagents in the solution. Generally, contact times of 5 to 60 seconds are sufficient to obtain different satisfactory etches. Various treating times can be utilized to control the degree of reflectance. The immersion time in practicing the present invention can be very short, for example, the glass article can be immersed and immediately withdrawn from the etching solution. The solution which adheres to the article in such a process is then allowed to remain on the article for a brief period of time to complete the desired etch before it is removed.

Variations of the amounts of the different ingredients outside the approximate limits set forth above result in defects in the etched glass. Vertical streaks appear in a glass sheet which is dipped in a vertical position into an etching solution which is high in HF and/or low in water and/or viscosity control agent. Insufficient etch will occur if either too much or too little HF or viscosity control agent is present in the etching solution. If there is a slight excess of ammonium bifluoride in the etching solution, the mat-etched surface appears milky and opaque. If there is a substantial excess of ammonium bifluoride in the etching solution, the mat-etched surface has an objectionable sparkly appearance. If there is not sufficient ammonium bifluoride in the etching solution, relatively large calcium fluoride or calcium silicofluoride crystals are formed on the glass surface during the etching whenever calcium containing glasses are etched. This results in the formation of undesirable pimples on the glass surfaces. This defect has been found to occur to a greater extent in etching plate glass compositions which have a higher concentration of calcium than window glass compositions. Some ammonium bifluoride should also be present in the etching solutions used to treat calcium free glasses. While the function performed by ammonium bifluoride in such a process is not fully understood, it is believed to help increase the solubility of sodium silicofluoride which, in turn, tends to decrease the degree of dispersion developed. This result is desirable because it tends to maintain the desired non-glare characteristics in the final glass article.

While the solution is in contact with the glass, very slight mat-etching is achieved on the tin treated surface. Sodium silicofluoride crystals are formed on the surface of the glass which has not been contacted with the tin. These crystals form in an average density of population of about $3 \times 10^5$ crystals per square inch of glass surface, the range of density being about $1 \times 10^5$ to about $5 \times 10^5$ crystals per square inch. The crystals appear to have bases of about 0.0015 to 0.003 inch in diameter, averaging about 0.002 inch in diameter. The crystals appear to have plateaus between about 0.001 and 0.0022 inch in diameter, averaging about 0.0015 inch in diameter. The height of the crystals averages about $30 \times 10^{-6}$ inches with the height ranging from about $20 \times 10^{-6}$ inches to $40 \times 10^{-6}$ inches.

In the present invention, the crystal size varies inversely with the density of the crystals. The crystals mask the areas of glass underneath them from attack by the solution. The etching therefore occurs predominantly in the areas between the crystals. In the method of the present invention, the glass article being treated, upon being removed from the solution, is cleaned to remove the masking crystals and any residual solution and/or reaction products remaining on the surface of the article.

The exact mechanism by which the unusual results obtained by the practice of the invention is not completely understood. However, it is theorized that the surfaces previously contacted with molten tin are chemically rich in tin and it is the presence of the tin which prevents substantial mat-etching of the glass surface. With regard to the surfaces not contacted by the tin, it is theorized that when the alkali containing glass article is immersed in the etching solution, the hydrofluoric acid attacks the glass surface and dissolves away part of the glass surface resulting in an alkali silicofluoride saturated layer of solution at the glass-solution interface. Alkali silicofluoride crystals precipitate from this saturated layer of solution onto the glass surface. The alkali silicofluoride crystals protect the glass underneath the point at which they are forming from further attack by the hydrofluoric acid in the etching solution. This mechanism is known as crystal image formation. The alkali silicofluoride crystals will be composed of the alkali present in the glass; for example, if the glass is a soda-lime-silica glass, the resulting crystals will be sodium silicofluoride. If the glass contains lithium or potassium, the resulting crystals will be lithium silicofluoride and potassium silicofluoride, respectively.

Crystal image formation results from insoluble products precipitating out of the etching solution as the solvent becomes saturated with products formed from the reaction of the etching solution with the glass surface. These precipitates form in a unique manner in that they tend to adhere to the original surface in order to minimize the energy required for their growth. As the precipitated crystal grows, it protects an increasingly greater area of the surface to which it adheres so that the surface areas farthest from the point of origin of the crystal are exposed to attack by the etching solution for a longer period of time. Thus, the crystals tend to form an inverse contour of their own shape upon the glass surface, i.e., a crystal image.

The number of these crystals which form on the glass surface per unit volume of etching solution constitutes the degree of dispersion of the solution. At the inception of precipitation, one definite degree of dispersion is established. Further precipitation of insoluble product does not produce any new nucleation but simply adds to the crystal growth of the nuclei originally formed. The degree of dispersion is related to the size of the crystals formed. The higher the degree of dispersion, the smaller will be the terminal crystal size.

Three factors affect the degree of dispersion. These factors are reagent concentration, precipitate solubility, and viscosity. For high degrees of dispersion, it is necessary to have solutions with high reagent concentration, low precipitate solubility and high viscosity. Lower degrees of dispersion are obtained by decreasing reagent concentrations, increasing precipitate solubilities and decreasing solution viscosities.

The crystal size determines in part the depth of attack of the etch. With larger terminal crystal sizes the etch is deeper. The formation of large crystals produces a glass surface having high reflectance values. The formation of moderately small crystals (about $3 \times 10^5$ per square inch of surface) produces a glass surface having low reflectance values and the formation of very small crystals produces a glass surface having high reflectance values. Very small crystals produce high reflectance values because the surface discontinuities produced are so small that the surface remains essentially smooth.

The desired alkali silicofluoride crystalline size and the desired crystal distribution over the glass surface is produced in addition to other previously mentioned factors by controlling the viscosity of the etching solution. Controlling the viscosity of the etching solution with an inert controlling agent such as sorbitol or polyethylene glycol results in masking crystals being precipitated on the surface of the glass which do not form a continuous protecting layer. The hydrofluoric acid present in the etching bath is still able to attack the unmasked glass around the scattered, protecting alkali silicofluoride crystals which form.

The differential attack of the solution on the protected areas masked by the alkali silicofluoride crystals on the glass surface and the unprotected glass in between the sodium silicofluoride crystals produces an irregular glass surface exhibiting the desired low reflectance characteristics. The attack of the etching solution around the sodium silicofluoride crystals produces a crystal image or essentially an outline of removed glass about the crystal.

The tin deficient surface of the glass produced by the techniques of the present invention comprises a plurality of closely spaced, separate, irregularly shaped plateaus having an occurrence number ranging from about $1 \times 10^5$ to $5 \times 10^5$ per square inch, the average number being about $3 \times 10^5$ per square inch. These plateaus are about $20 \times 10^{-6}$ to $40 \times 10^{-6}$ inches in height, and average about $30 \times 10^{-6}$ inches in height. The height of the plateaus represents the depth of the etch. The plateaus measure about 0.001 to 0.002 inch in diameter and average about 0.0015 inch. The plateaus rest on what might be called bases which lie in a plane parallel to the general plane of the surfaces of the plateaus. This parallel plane is located beneath the general plane of the glass surfaces, a distance equal to the depth of the etch. These bases measure about 0.0015 to 0.003 inch in diameter, and average about 0.003 inch in diameter. The moderately small and relatively uniform sized plateaus produced on the tin deficient surface of the glass sheet develop the low specular reflectance glass surface characteristic of the present invention.

In practicing the method of the present invention, the glass article should be cleaned after contact with the molten tin since any metal scum or stain, wheel mark abrasions, scratches and seeds on the surfaces will be present on the etched glass. Dirt and scum may be removed by the use of commercial glass cleaning products and/or conventional glass washing machines followed by wiping with a clean cloth. Dirt, scum, stain, surface abrasions, and/or scratches may be removed by buffing, if necessary, using an aqueous slurry of cerium oxide or rouge.

The glass should be dry when it is immersed in the etching solution. The addition of water to the etching solution will upset the chemical make-up of the solution and change the character of the etch. Also, if part of the glass surface is dry and part is wet, the resulting mat-etch on the glass will be non-uniform.

It has been found that fumes from the etching solution which may contact the untreated glass surfaces have a tendency to inhibit the action of the solution on the glass surfaces. This results in a non-uniform effect achieved by the solution. Therefore, the untreated glass surfaces should be kept out of contact with the fumes or vapors emanating from the solution before the article is immersed in the solution. This may be accomplished by providing adequate ventilation to remove the fumes from the top of the container containing the etching solution. It can also be accomplished by cooling the bath, for example to a temperature of about 50° F. which reduces the amount of fumes produced. The reduction of the amount of fumes produced is helpful in maintaining the correct concentration of the various ingredients.

The etching bath should be free from waves while the glass is being lowered into it. It has been found that horizontal streaks show up in the finished product when the glass is immersed into a turbulent bath. In this regard, plunging of the glass in the bath should be avoided. Moderate turbulence in the bath during the time the glass is immersed is not harmful. Agitation of the bath can be employed if the uniformity of mat-etch is insufficient, e.g., if there is more etch in the bottom portion of a vertically dipped glass sheet than in the top portion, this can be overcome by agitation of the bath during submersion of the glass sheet in the bath.

The glass article may be immersed in the container of etching solution by any suitable means. A convenient means for accomplishing this comprises a hydraulic dipping mechanism in which four brass tongs tipped with Monel metal are suspended from a channel located above the container of etching solution. The tongs are adapted to hold a glass article, such as a sheet of glass, and to be raised and lowered at a uniform rate of speed so that the glass article may be entirely immersed in the solution and entirely removed therefrom. When a glass sheet is dipped into a bath, the sheet should be dipped within about 5 to 10 degrees of a vertical position in order to avoid streaks from forming in the etched sheet. These streaks occur on what is considered the bottom side if the glass sheet is tilted. The glass sheet should be introduced into the bath at a uniform rate of introduction in order to prevent the formation of horizontal streaks (streaks parallel to the top surface of the bath) in the glass.

Another alternate dipping technique which has been found to prevent the formation of horizontal streaks during etching is a horizontal dipping technique. The glass sheet is introduced into the etching bath in a nearly horizontal plane using a smooth continuous scooping motion. After the glass sheet has been completely immersed, it is held horizontally below and parallel to the etching solution's surface the desired length of time. The glass sheet is then removed using a smooth continuous low angle sliding motion similar to that used in immersing the glass.

The temperature of the etching bath and the glass are important. For best results in etching high alkali content glasses, for example, soda glasses, both the bath and glass should be between room temperature and about 30° F. Low alkali content glasses, for example, soda glasses, on the other hand, for best results should be etched when both the glass and the treating solution are between room temperature and about 130° F.

These temperature ranges have been determined for a sorbitol containing etching solution; the optimum temperature for etching may vary to some degree depending upon the particular viscosity control agent present. The proper temperature range for a particular etching solution and a particular glass may be readily determined by using the above temperatures as a guide, etching a few pieces of glass and adjusting the temperature of the bath to obtain the desired type of etched surface.

After the glass article has been immersed in the etching solution for the necessary period of time and then removed, any residual solution and/or reaction products should be removed from the glass surfaces. This may advantageously be accomplished by rinsing the surfaces of the treated glass article with water, as by spraying with large volumes of water to prevent streaking. Care must also be taken after removing with wet glass from the etching solution to prevent strong air drafts from striking the glass. Air drafts may cause a differential evaporation of water from the etching solution on the glass surfaces and thus produce variable concentrations of the glass attacking ingredients in the etching solution over different areas of the glass surface.

Because of the highly corrosive nature of the etching solution, extreme care must be taken in storing and working with the solution. The solution should not be stored in a glass or ordinary metal tank. However, it may be kept in a steel tank which is lined with rubber, Teflon, polyethylene, polystyrene, etc. Any metal processing equipment which comes into contact with the solution, such as metal tips on tongs used to grasp the glass article and lower it into the solution, is preferably composed of or coated with Monel metal (an alloy of 67 percent nickel, 28 percent copper, and 5 percent cobalt). Monel metal is highly resistant to attack by the etching solution.

The tank containing the etching solution is preferably covered when not in use to reduce loss of solution through evaporation. A suitable cover for this purpose is made of brass and lined with a rubber gasket.

The following examples illustrate the best modes contemplated for carrying out this invention:

Example I

An etching solution is prepared by mixing together in a steel tank lined with rubber 330 parts by weight 70 percent hydrofluoric acid, 30.7 parts by weight ammonium bifluoride, 384 parts by weight sorbitol and 82 parts by weight water.

These batch ingredients produce an etching bath in which the ratio of parts by weight hydrogen fluoride to parts by weight of water is about 1.28 and in which the ratio of parts by weight ammonium bifluoride to parts by weight water is about 0.17. The viscosity of this etching bath is about 9.15 centipoises when measured at a temperature of about 75° F.

A rectangular sheet of lime-soda-silica glass measuring 34 inches by 50 inches is heated to a temperature of about 1050° F. and contacted on one surface with molten tin at a temperature of about 1050° F. by laying the heated glass on the surface of a bath of molten tin for about 5 minutes. The glass remains supported on the surface of the tin without sinking since the density of the tin is greater than that of the glass.

The glass is then removed from the tin bath and cooled gradually to room temperature according to conventional flat glass cooling and annealing procedures. The cooled glass is cleaned and immersed vertically in the solution for 30 seconds. The sheet is removed from the etching solution and thoroughly rinsed with a spray of water. The reflectance and resolution properties of the surfaces of the glass sheet thus treated are excellent. The sheet of glass used in this example has the following composition.

| Component: | Percent by wt. |
|---|---|
| $SiO_2$ | 71.6 |
| $Na_2O$ | 13.1 |
| $CaO$ | 11.7 |
| $MgO$ | 2.5 |
| $Na_2SO_4$ | 0.7 |
| $NaCl$ | 0.1 |
| $Fe_2O_3$ | 0.1 |
| $Al_2O_3$ | 0.2 |

Example II

A solution is prepared by mixing together in a rubber-lined, steel tank 330 parts by weight 70 percent hydrofluoric acid, 25.6 parts by weight ammonium bifluoride, 384 parts by weight sorbitol and 55 parts by weight water.

This etching solution contains a ratio of parts by weight hydrogen fluoride to parts by weight water of about 1.5 and a ratio of parts by weight ammonium bifluoride to parts by weight water of about 0.17. The viscosity of this etching bath is about 11.97 centipoises at about 75° F.

A 30 inch square sheet of glass is heated to a temperature of about 950° F. and contacted on one surface with a molten tin alloy containing 60 percent by weight tin and 40 percent by weight lead by laying the heated glass on the surface of the bath of the molten alloy for about 5 minutes.

The glass is removed from the alloy bath and gradually cooled to room temperature according to conventional flat glass cooling and annealing procedures. The cooled glass is cleaned and then immersed vertically in the etching solution for 30 seconds. The sheet is removed from the etching bath and thoroughly rinsed by spraying with water. The thus treated glass has a non-glare surface on the side not contacted with the alloy and a relatively high-reflecting surface on the surface which was in contact with the molten alloy. The sheet of glass used in this example has the following composition.

| Component: | Percent by wt. |
|---|---|
| $SiO_2$ | 73.35 |
| $Na_2O$ | 13.14 |
| $CaO$ | 8.30 |
| $MgO$ | 3.43 |
| $Na_2SO_4$ | 0.43 |
| $NaCl$ | 0.04 |
| $Fe_2O_3$ | 0.09 |
| $Al_2O_3$ | 1.22 |

Example III

In a steel tank lined with polyethylene, there is mixed 129 parts by weight 70 percent hydrofluoric acid, 10 parts by weight ammonium bifluoride, 130 parts by weight sorbitol and 29.3 parts by weight water. This etching solution contains a ratio of parts by weight hydrogen fluoride to parts by weight water of about 1.33, and a ratio of parts by weight ammonium bifluoride to parts by weight water of about .147. The viscosity of this etching bath is about 6.39 centipoises at about 75° F.

A 30 inch by 60 inch sheet of gray glass is heated to a temperature of 1050° F. and contacted on one surface with molten lead by laying the heated glass on the surface of a bath of molten lead for about 5 minutes. The glass is removed from the lead bath and cooled gradually to room temperature according to conventional flat glass cooling and annealing procedures. The cooled glass is cleaned and buffed lightly with a rouge polishing solution to remove any lead stain remaining on the glass sheet.

The clean glass sheet is immersed vertically in the above-indicated solution for 15 seconds, removed and thoroughly rinsed by flushing with water. The sheet of glass is then used as a television implosion window with the major surface of the glass sheet which was not contacted with the lead prior to the etching being closest the viewer. This surface of the glass sheet has a relatively low spectral reflectance; whereas the opposite side of the sheet which was in contact with the lead bath has a relatively high spectral reflectance.

The glass used in this example has the following composition.

| Component: | Percent by weight |
|---|---|
| $SiO_2$ | 69.18 |
| $Na_2O$ | 15.60 |
| CaO | 6.90 |
| MgO | 2.75 |
| $Na_2SO_4$ | 0.50 |
| $Al_2O_3$ | 3.25 |
| $Fe_2O_3$ | 0.087 |
| NaCl | 0.024 |
| $K_2O$ | 0.98 |
| BaO | 0.55 |
| $As_2O_5$ | 0.09 |
| NiO | 0.027 |
| CoO | 0.0042 |

*Example IV*

In a steel tank lined with polyethylene, there is mixed 129 parts by weight 70 percent hydrofluoric acid, 10 parts by weight ammonium bifluoride, 95 parts by weight sorbitol and 21 parts by weight water. This etching solution contains a ratio of parts by weight hydrogen fluoride to parts by weight water of about 1.5 and a ratio of parts by weight ammonium bifluoride to parts by weight water of about 1.68. The viscosity of this etching bath is about 3.37 centipoises at about 75° F.

The solution thus formed is maintained at about 50° F. by a cooling coil surrounding the tank in heat conducting relation therewith. The solution is gently agitated continuously by circulation through baffles by a Monel metal impeller.

A 30 by 60 inch sheet of gray glass is heated to a temperature of about 1050° F. and contacted on one surface only with molten tin by laying the heated glass on the surface of a bath of molten tin for about 5 minutes. The glass remains supported on the surface of the tin without sinking since the density of the tin is greater than that of the glass.

The glass is removed from the tin bath and cooled gradually to room temperature according to conventional flat glass cooling and annealing procedures. The cooled glass is thoroughly washed and freed from any scum or stain. The side which was in contact with the molten tin is buffed lightly with a cerium oxide polishing slurry to remove any tin stain on the surface of the glass.

The clean glass is then immersed vertically in the etching solution and held therein for 25 seconds. The glass is removed from the solution and thoroughly rinsed with water. A television implosion window fashioned from the sheet possesses excellent resolution and non-glare properties.

The glass used in this example has the following composition.

| Component: | Percent by weight |
|---|---|
| $SiO_2$ | 69.32 |
| $Na_2O$ | 16.12 |
| CaO | 7.26 |
| MgO | 2.76 |
| $Na_2SO_4$ | .51 |
| NaCl | .03 |
| $Fe_2O_3$ | .09 |
| $Al_2O_3$ | 3.12 |
| $As_2O_5$ | .10 |
| CoO | .004 |
| NiO | .027 |
| $K_2O$ | .44 |

*Example V*

An etching solution is prepared by mixing in a rubber lined steel tank 129 parts by weight of 70 percent hydrofluoric acid, 10 parts by weight ammonium bifluoride, 45 parts by weight sorbitol and 21 parts by weight water. The resulting etching solution contains, in percent by weight, about 44 percent hydrogen fluoride, 5 percent ammonium bifluoride, 22 percent sorbitol and 29 percent water. The ratio of parts by weight hydrogen fluoride to parts by weight water is about 1.52, the ratio of parts by weight ammonium bifluoride to parts by weight water is about 0.172 and the ratio of parts by weight sorbitol to parts by weight water is about 0.76 in this solution. The viscosity of this etching solution is about 1.7 centipoises at a temperature of about 75 degrees Fahrenheit.

A sheet of glass 4 inches by 6 inches by ¼ of an inch thick previously treated on a molten tin bath on one major surface in accordance with the method of Example I is vertically immersed in this solution for 30 seconds. The temperature of the solution is about 45 degrees Fahrenheit. The glass is then withdrawn from the etching solution, and flushed with water to remove any residual solution and reaction products. The glass is found to exhibit excellent low reflectance and resolution characteristics.

The composition of the glass treated in this example is the same as that of the glass in Example III.

*Example VI*

An etching solution is prepared by mixing in a rubber lined steel tank, 129 parts by weight 70 percent hydrofluoric acid, 10 parts by weight ammonium bifluoride, 240 parts by weight sorbitol and 30 parts by weight water. The resulting solution contains, in percent by weight, about 22 percent hydrogen fluoride, 2.4 percent ammonium bifluoride, 58.8 percent sorbitol and 16.8 percent water. The ratio of parts by weight hydrogen fluoride to parts by weight water is about 1.31, the ratio of parts by weight ammonium bifluoride to parts by weight water is about 0.143 and the ratio of parts by weight sorbitol to parts by weight water is about 3.5. The viscosity of this etching solution is about 62 centipoises at a temperature of about 75 degrees Fahrenheit.

A sheet of glass 4 inches by 6 inches by ¼ of an inch thick previously treated on a molten tin bath on one major surface in accordance with the method of Example I is vertically immersed in this solution for 60 seconds. The temperature of the solution during immersion is approximately 75 degrees Fahrenheit. The sheet is then withdrawn from the solution and thoroughly rinsed with water to remove any residual solution or reaction products. The glass sample is found to exhibit excellent low reflectance and resolution properties.

The composition of the glass treated in this example is the same as that of the glass in Example II.

*Example VII*

The following examples illustrate the effectiveness of various types of viscosity control agents. The glass etched in each of the following examples had a composition approximating that disclosed in Example I.

(A) *Glycerine.*—A glycerine containing etching solution of the following composition was prepared:

| | Grams |
|---|---|
| Hydrofluoric acid (70%) | 129 |
| Ammonium bifluoride | 10 |
| Water | 21 |
| Glycerine | 60 |

The solution had a viscosity of about 2 centipoises at 75° F. The $HF:H_2O$ ratio was 1.57:1.

A sheet of glass was dipped in the solution while the solution temperature was maintained at 40° F. for a period of about 30 seconds. In comparison to the non-glare surface obtained with a sorbitol solution of the type illustrated in the above examples, a fair to good non-glare surface was obtained.

(B) *Phosphoric acid.*—A phosphoric acid containing etching solution of the following composition was prepared:

| | Grams |
|---|---|
| Hydrofluoric acid (70%) | 129 |
| Ammonium bifluoride | 10 |
| Phosphoric acid (85%) | 125 |

The solution had a viscosity of about 2.5 centipoises at 75° F. and an $HF:H_2O$ ratio of 1.63:1.

A sheet of glass was dipped for 90 seconds in the above solution while the solution was maintained at room temperature. In comparison with glass surfaces etched in a sorbitol solution, a good non-glare surface was obtained. The surface exhibited random spots which appeared to be larger crystals.

(C) *Diethylene glycol.*—A diethylene glycol containing etching solution was prepared having the following composition:

| | Grams |
|---|---|
| Hydrofluoric acid (70%) | 129 |
| Ammonium bifluoride | 10 |
| Water | 21 |
| Diethylene glycol | 50 |

The solution had a viscosity of approximately 2 centipoises at 75° F. and an $HF:H_2O$ ratio of 1.57:1.

A sheet of glass was dipped for 30 seconds into the solution at room temperature. A fair to good non-glare surface was produced with this solution in comparison with the non-glare surfaces obtained from a sorbitol solution.

(D) *Polyethylene glycol.*—Polyethylene glycol is an especially useful viscosity control agent inasmuch as exceptionally desirable etch surfaces are obtainable over a wide range of solution temperatures.

A polyethylene glycol having a molecular weight of about 3500 was utilized in a solution having the following composition:

| | Grams |
|---|---|
| Hydrofluoric acid (70%) | 129 |
| Ammonium bifluoride | 10 |
| Water | 21 |
| Polyethylene glycol | 35 |

The solution had a viscosity of approximately 3.5 centipoises at 75° F. and an $HF:H_2O$ ratio of about 1.5:7.

A sheet of glass was dipped in the above solution for 15 seconds while the solution was maintained at room temperature. An excellent, non-glare surface was obtained. The non-reflective surface was slightly better than that obtained with sorbitol solutions. The surface was very non-reflective, and the glass still had excellent resolution when objects close to the glass were viewed through the glass.

(E) *Sucrose.*—A sucrose containing etching solution was prepared from the following ingredients:

| | Grams |
|---|---|
| Hydrofluoric acid (70%) | 129 |
| Ammonium bifluoride | 10 |
| Water | 21 |
| Sucrose | 95 |

The solution had a viscosity of approximately 3.5 centipoises at 75° F. and an $HF:H_2O$ ratio of about 1.57:1.

A sheet of glass was dipped for 30 seconds in the solution maintained at 35° F. A very good etch was produced. Sucrose provides a suitable viscosity control for an etching solution; however, sucrose is not particularly useful for a commercial production operation inasmuch as the sucrose decomposes in the presence of HF over a period of time.

The above glasses had not been contacted with molten tin; however, the effectiveness of the above described solutions would be realized with similar glass compositions produced by the float glass process.

The technique of producing a low reflecting glass article taught in the present application is readily adapted to high volume automated production methods. A continuous production line could be installed in which glass sheets manufactured by the float process would be immersed at one end of a long etching tank and continuously moved through the tank until the desired etch time had elapsed. The glass sheets would then be removed. The length of the etching tank and the rate of travel of the glass sheets through the tank would be chosen to provide each sheet with the desired time in contact with the etching solution to develop the desired surface on the tin deficient major surface.

Another advantage of the present invention is that it is almost 100 percent efficient with respect to the number of articles treated. If a glass article is dirty or possesses some other type of surface flaw on the tin deficient major surface which prevents a continuous even etch from developing during the first treatment, the article can be recovered by merely recycling it for an additional treatment. The first treatment removes the defect and the second develops the desired non-glare surface. The article can even be recycled several times if necessary to produce an acceptable product so long as the final article thickness does not fall below an acceptable level or the tin rich surface layer removed. Even scratch wheeled etched articles can be recycled as can bent shapes.

Although the present invention has been described with respect to specific details of certain embodiments thereof, it is not intended that such details serve as limitations upon the scope of the invention except insofar as they are set forth in the accompanying claims.

We claim:

1. A process for producing a low specular reflecting surface on a first portion of the surface of an alkali containing glass article and a relatively high specular reflecting surface on a second portion of the surface of a glass article which comprises contacting said second surface portion with a molten metal selected from the group consisting of tin, lead, and alloys thereof, and thereafter contacting the glass article with a mat etching solution for a sufficient length of time to provide a low specular reflecting surface on said first surface portion, removing the article from contact with the etching solution and thereafter removing any residual materials from the surfaces of the glass article.

2. The process of claim 1 wherein the glass is a lime-soda-silica glass.

3. The process of claim 1 wherein the etching solution comprises an aqueous solution of hydrogen fluoride and ammonium bifluoride in which the ratio of parts by weight hydrogen fluoride to parts by weight water is between 1.1 and 1.6 and in which the ratio of parts by weight ammonium bifluoride to parts by weight water is between 0.05 and 1.0 and which contains a sufficient concentration of a solution viscosity controlling material which is soluble and chemically inert in the solution to develop a solution viscosity between 0.8 and 75 centipoises at a temperature of about 75° F.

4. A process according to claim 3 in which the viscosity controlling material is a chemical material having an OH group present selected from the class consisting of hydroxyl groups, carboxyl groups, and oxyacid groups.

5. A process according to claim 4 in which the viscosity control material is selected from the class consisting of sorbital, polyethylene glycol, diethylene glycol, sucrose, glycerine, and phosphoric acid.

6. A process according to claim 4 in which the ratio of parts by weight of viscosity control agent to parts by weight water is between 0.05 and 4.0.

7. A process according to claim 1 in which the etching solution comprises an aqueous solution of hydrogen fluoride and ammonium bifluoride and which contains sorbitol as a viscosity controlling material, in which the ratio of parts by weight hydrogen fluoride to parts by weight water is between 1.28 and 1.5 and in which the ratio of parts by weight ammonium bifluoride to parts by weight water is between 0.067 and 0.738 and in which the ratio of parts by weight sorbitol to parts by weight water is between 0.07 and 3.5.

8. A process according to claim 7 in which the etching solution has a viscosity between 0.88 and 62 centipoises at a temperature of about 75° F.

9. A process according to claim 1 wherein the glass article is a sheet of glass comprising from 50 to 75 percent by weight $SiO_2$, from 5 to 17 percent by weight $Na_2O$, from 0 to 10 percent by weight $K_2O$, the sum of $Na_2O$ and $K_2O$ being from 10 to 18 percent by weight, from 0 to 15 percent by weight of CaO, from 0 to 7 percent by weight of MgO, the sum of CaO and MgO being from 0 to 16 percent by weight.

10. The process of claim 1 wherein the molten metal is tin.

11. A glass article produced by the method of claim 10 wherein said high specular reflecting surface is rich in tin.

References Cited
UNITED STATES PATENTS 2,622,016   12/1952   Gilstrap et al.
3,337,323   8/1967   Loukes et al. _____ 65—99 X DONALL H. SYLVESTER, *Primary Examiner.*

R. L. LINDSAY, *Assistant Examiner.*